United States Patent
Nakano et al.

(10) Patent No.: US 9,092,845 B2
(45) Date of Patent: Jul. 28, 2015

(54) IMAGE PROCESSING DEVICE WITH DEFECT CORRECTING CIRCUIT AND IMAGE PROCESSING METHOD

(71) Applicant: Kabushiki Kaisha Toshiba, Tokyo (JP)

(72) Inventors: Teppei Nakano, Kanagawa (JP); Keizo Tashiro, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 235 days.

(21) Appl. No.: 13/753,896

(22) Filed: Jan. 30, 2013

(65) Prior Publication Data
US 2013/0208974 A1    Aug. 15, 2013

(30) Foreign Application Priority Data
Feb. 15, 2012    (JP) ................... 2012-030724

(51) Int. Cl.
G06K 9/00    (2006.01)
G06T 7/00    (2006.01)
G06T 5/00    (2006.01)
H04N 5/367    (2011.01)

(52) U.S. Cl.
CPC ............ *G06T 7/001* (2013.01); *G06T 5/005* (2013.01); *H04N 5/3675* (2013.01); *G06T 2207/10024* (2013.01)

(58) Field of Classification Search
None
See application file for complete search history.

(56) References Cited

U.S. PATENT DOCUMENTS 7,508,975 B2 *   3/2009   Izumi et al. .................. 382/149
8,077,406 B2    12/2011   Hachitani et al.

FOREIGN PATENT DOCUMENTS

| JP | 11-355667 | 12/1999 |
| JP | 2002-223391 | 8/2002 |
| JP | 2005-64697 A | 3/2005 |
| JP | 2006-13988 | 1/2006 |
| JP | 2008-233547 | 10/2008 |
| JP | 2008-301481 A | 12/2008 |
| JP | 2010-68329 | 3/2010 |

OTHER PUBLICATIONS

Japanese Office Action issued Jul. 22, 2014 in Patent Application No. 2012-030724 with English Translation.
Japanese Office Action dated Feb. 3, 2015, issued in Japanese Application No. 2012-030724 (with English translation).

* cited by examiner

*Primary Examiner* — Siamak Harandi
(74) *Attorney, Agent, or Firm* — Oblon, McClelland, Maier & Neustadt, L.L.P.

(57) ABSTRACT

According to one embodiment, a condition judging unit judges whether a target pixel corresponds to a defect condition based on a signal of the target pixel and a signal of a horizontal peripheral pixel. A signal substituting unit performs signal substitution on the target pixel corresponding to the defect condition. When the condition judging unit judges that at least one of a vertical peripheral pixel and an oblique peripheral pixel corresponds to the defect condition, the signal substituting unit stops the signal substitution on the target pixel.

19 Claims, 6 Drawing Sheets

IMAGE PROCESSING DEVICE WITH DEFECT CORRECTING CIRCUIT AND IMAGE PROCESSING METHOD

CROSS-REFERENCE TO RELATED APPLICATIONS

This application is based upon and claims the benefit of priority from Japanese Patent Application No. 2012-30724, filed on Feb. 15, 2012; the entire contents of which are incorporated herein by reference.

FIELD

Embodiments described herein relate generally to an image processing device and an image processing method.

BACKGROUND

In recent years, in solid-state imaging devices, pixels have been miniaturized with a high resolution of the pixels. Under such a circumstance, the solid-state imaging device may have a problem that a defective portion (hereinafter, appropriately referred to as a "defect") of a digital image signal caused due to a pixel which does not normally function occurs. In defect inspection at the time of manufacturing a solid-state imaging device, a product for which many pixel defects greater than regulations are recognized is treated as a defective product. However, as the regulations become stricter, a yield ratio of solid-state imaging device may deteriorate, and thus a manufacturing cost may increase. Accordingly, in a solid-state imaging device according to the related art, a method of causing a defect to be unnoticeable through signal processing in a defect correcting circuit is actively utilized.

The defect correcting circuit judges whether a target pixel to be subjected to defect correction is a defect by comparing a signal of the target pixel to a signal of a peripheral pixel located in the periphery of the target pixel. In regard to the process of judging whether the target pixel is a defect, for example, there is a known defect correcting circuit that uses a signal of a peripheral pixel located in a line including the target pixel and signals of peripheral pixels located in lines before and after the line. For example, a pixel with the same color as that of the target pixel is used as the peripheral pixel.

In order for the defect correcting circuit to perform such a process, the solid-state imaging device necessarily includes a line memory that stores a plurality of lines. By applying the line memory, the solid-state imaging device is able to perform the defect correction using the signals of the peripheral pixels included in the lines located before and after the line including the target pixel. However, there is a problem that a circuit size may increase. When it is judged whether the target pixel is a defect using only a target pixel and a peripheral pixel located in the line including the target pixel, the solid-state imaging device has a problem that erroneous correction may occur, although the circuit size is reduced.

DETAILED DESCRIPTION

In general, according to one embodiment, an image processing device includes a defect correcting circuit. The defect correcting circuit performs defect correction on an image signal from a pixel array. The defect correcting circuit includes a condition judging unit and a signal substituting unit. The condition judging unit judges whether the target pixel corresponds to a defect condition based on a signal of the target pixel and a signal of a horizontal peripheral pixel in the image signal. The horizontal peripheral pixel is a pixel which is parallel to the target pixel in the pixel array in the horizontal direction. The horizontal peripheral pixel is a pixel with the same color as that of the target pixel. The signal substituting unit performs signal substitution on the target pixel corresponding to the defect condition. When the condition judging unit judges that at least one of a vertical peripheral pixel and an oblique peripheral pixel corresponds to the defect condition, the signal substituting unit stops the signal substitution on the target pixel. The vertical peripheral pixel is a pixel which is parallel to the target pixel in the pixel array in a vertical direction. The vertical peripheral pixel is a pixel with the same color as that of the target pixel. The oblique peripheral pixel is a pixel which is parallel to the target pixel in an oblique direction. The oblique peripheral pixel is a pixel with the same color as that of the target pixel.

Exemplary embodiments of an image processing device and an image processing method will be explained below in detail with reference to the accompanying drawings. The present invention is not limited to the following embodiment.

Figure 1:
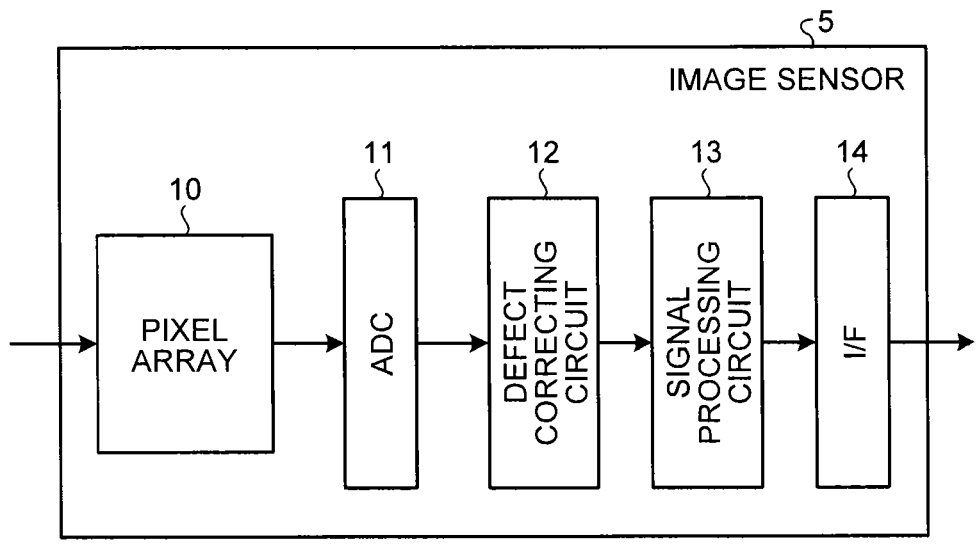
FIG. 1 is a block diagram illustrating a general configuration of an image sensor which is a solid-state imaging device according to an embodiment.
Figure 2:
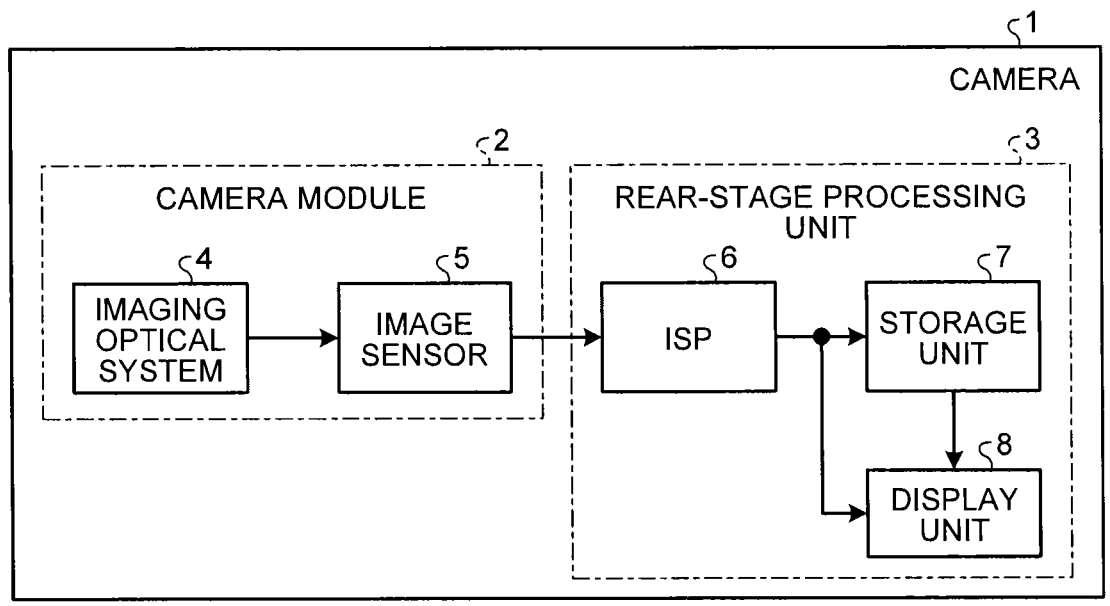
FIG. 2 is a block diagram illustrating a general configuration of a camera including the image sensor illustrated in FIG. 1.

FIG. 1 is a block diagram illustrating a general configuration of an image sensor which is a solid-state imaging device according to the embodiment. FIG. 2 is a block diagram illustrating a general configuration of a camera including the image sensor illustrated in FIG. 1.

A camera 1 includes a camera module 2 and a rear-stage processing unit 3. The camera module 2 includes an imaging optical system 4 and an image sensor 5. The rear-stage processing unit 3 includes an image signal processor (ISP) 6, a storage unit 7, and a display unit 8. The camera 1 is, for example, a digital camera. The camera module 2 is used not only in a digital camera, but also in an electronic apparatus such as a camera-attached portable terminal.

The imaging optical system 4 acquires light from a subject and forms a subject image. The image sensor 5 captures the subject image. The ISP 6 performs signal processing on an image signal obtained through the imaging performed by the image sensor 5. The storage unit 7 stores an image subjected to the signal processing by the ISP 6. The storage unit 7 outputs an image signal to the display unit 8 in response to a user's operation or the like. The display unit 8 displays the image according to the image signal input from the ISP 6 or the storage unit 7. The display unit 8 is, for example, a liquid crystal display.

The image sensor 5 is, for example, a complementary metal oxide semiconductor (CMOS) image sensor. The image sensor 5 may be a charge coupled device (CCD) as well as the CMOS image sensor. The image sensor 5 includes a pixel array 10, an analog-to-digital converter (ADC) 11, a defect correcting circuit 12, a signal processing circuit 13, and an interface (I/F) 14.

The pixel array 10 converts the light acquired by the imaging optical system 4 into a signal charge to capture a subject image. For example, the pixel array 10 generates an analog image signal by acquiring signal values of respective color components of red (R), green (G), and blue (B) in the order corresponding to a Bayer array. The ADC 11 converts the image signal from the pixel array 10 from an analog signal to a digital signal.

The defect correcting circuit 12 performs defect correction on the image signal from the ADC 11. The defect correcting circuit 12 according to this embodiment corrects both white and black defects to be subjected to the defect correction. The white defect is a defect that indicates a high signal level compared to a case in which the function of a pixel is normal. The black defect is a defect that indicates a low signal level compared to a case in which the function of a pixel is normal.

The signal processing circuit 13 performs signal processing, such as noise cancellation, shading correction, or white balance adjustment, on the image signal from the defect correcting circuit 12. The defect correcting circuit 12 and the signal processing circuit 13 function as an image processing device that performs various kinds of image processing on a digital image signal from the ADC 11.

The I/F 14 outputs the image signal subjected to the signal processing by the signal processing circuit 13. The I/F 14 may perform conversion from serial input to parallel output or conversion from parallel input to serial output.

Figure 3:
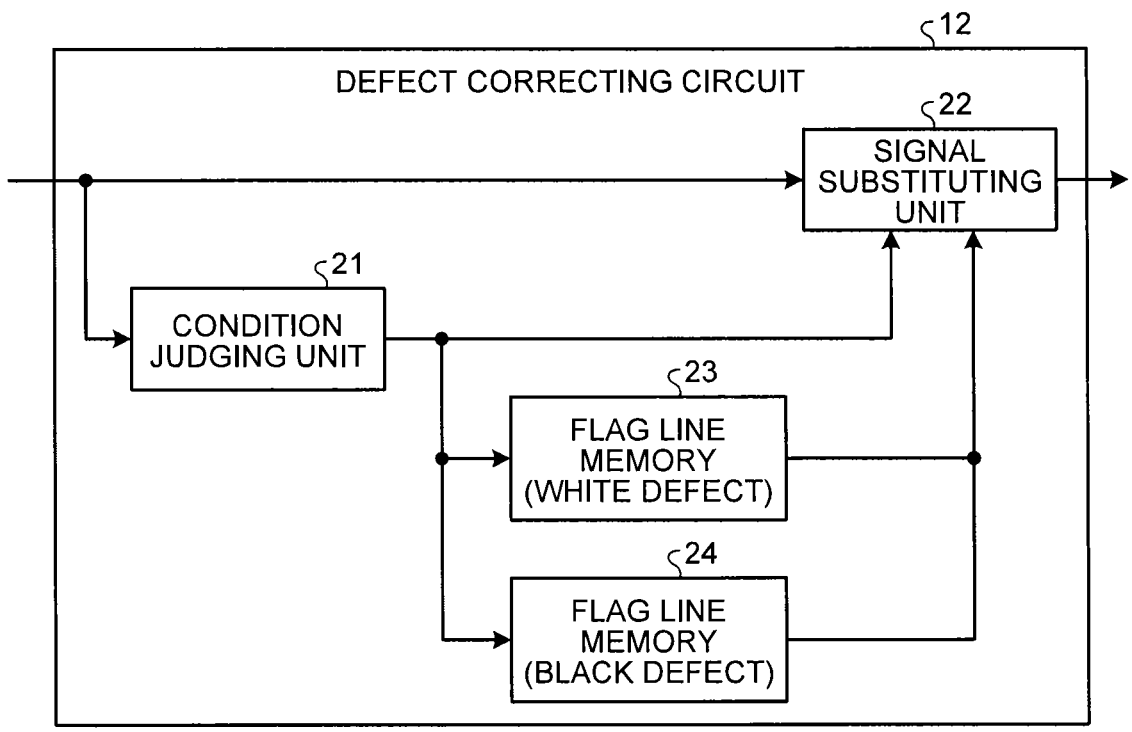
FIG. 3 is a block diagram illustrating the configuration of a defect correcting circuit.

FIG. 3 is a block diagram illustrating the configuration of the defect correcting circuit. The defect correcting circuit 12 includes a condition judging unit 21, a signal substituting unit 22, and flag line memories 23 and 24.

The condition judging unit 21 judges whether each pixel corresponds to a defect condition, referring to a signal of each pixel from the image signal. The signal substituting unit 22 performs signal substitution as defect correction on a target pixel corresponding to the defect condition. The target pixel is a pixel on which the defect correction is judged to be necessary or not to be necessary by the defect correcting circuit 12 and which is considered to be subjected to the defect correction when the defect correction is judged to be necessary.

The flag line memory 23 is a flag retaining unit that retains the judgment result for the white defect by the condition judging unit 21. The flag line memory 24 is a flag retaining unit that retains the judgment result for the black defect by the condition judging unit 21. A flag is 1-bit information indicating whether the pixel corresponds to the defect condition. The flag line memories 23 and 24 both retain the flag for each pixel of two lines.

Figure 4:
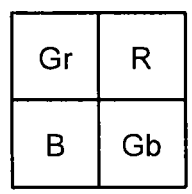
FIG. 4 is a diagram illustrating a Bayer array.
Figure 5:
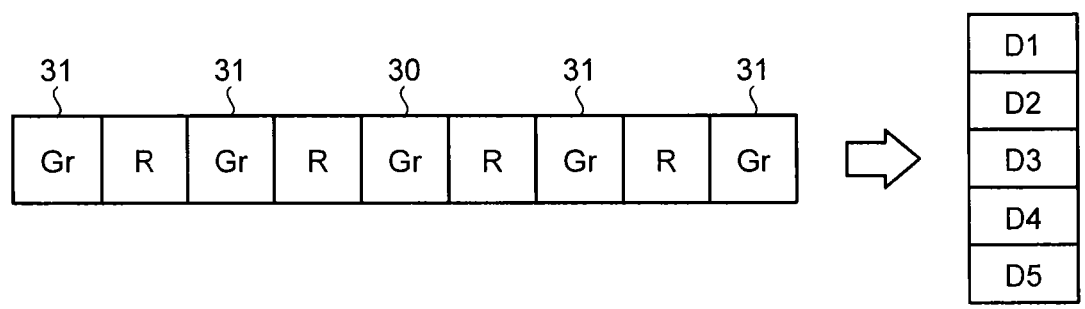
FIG. 5 is a diagram illustrating judgment in a condition judging unit.

FIG. 4 is a diagram illustrating a Bayer array. FIG. 5 is a diagram illustrating the judgment of the condition judging unit. The Bayer array is configured by a pixel block of two rows and two columns including four pixels of Gr, R, Gb, and B as a unit. An R pixel detects a red component. A B pixel detects a blue component. A Gr pixel and a Gb pixel detect a green component. The Gr pixel is located near the R pixel in a horizontal direction. The Gb pixel is located near the B pixel in the horizontal direction.

The condition judging unit 21 extracts a signal of a target pixel 30 and a signal of a horizontal peripheral pixel 31 from an image signal input as a signal of each line (a Gr/R line and a Gb/B line). The horizontal peripheral pixel 31 is a pixel that has the same color as the target pixel 30 and is parallel to the target pixel 30 in the horizontal direction in the pixel array 10.

The horizontal peripheral pixels 31 are, for example, four same color pixels that are parallel every other pixel in the horizontal direction by centering on one target pixel 30. In the example illustrated in FIG. 5, the target pixel 30 and the horizontal peripheral pixels 31 are Gr pixels. In this embodiment, the Gr pixel and the Gb pixel are not treated as the same color pixel. Further, the number and positions of the horizontal peripheral pixels 31 with respect to one target pixel 30 may be appropriately modified.

The condition judging unit 21 permutates a signal of the target pixel 30 and signals of the four horizontal peripheral pixels 31 according to a signal level. For example, five signals permutated in order from the signal with a higher signal level are assumed to be D1 to D5. Based on the signals D1 to D5, the condition judging unit 21 judges whether the pixel corresponds to the defect condition.

The condition judging unit 21 calculates a difference (D1−D2) between the signal D1 with the highest signal level and the signal D2 with the signal level higher after the signal D1, and then compares the difference "D1−D2" with a predetermined white defect judgment threshold value (Th_W). For example, Th_W is a value set in advance. The condition judging unit 21 retains Th_W.

When "(D1−D2)>Th_W" is satisfied, the condition judging unit 21 judges that the signal D1 is a signal satisfying the white defect condition and the pixel corresponds to the white defect condition. When "(D1−D2)>Th_W" is not satisfied, the condition judging unit 21 judges that the signal D1 is not a signal satisfying the white defect condition and the pixel does not correspond to the white defect condition.

The condition judging unit 21 calculates a difference (D4−D5) between the signal D5 with the lowest signal level and the signal D4 with a signal level lower after the signal D5, and then compares the difference "D4−D5" with a predetermined black defect judgment threshold value (Th_B). For example, Th_B is a value set in advance and is retained by the condition judging unit 21.

When "(D4−D5)>Th_B" is satisfied, the condition judging unit 21 judges that the signal D5 is a signal satisfying the black defect condition and the pixel corresponds to the black defect condition. When "(D4−D5)>Th_B" is not satisfied, the condition judging unit 21 judges that the signal D5 is not a signal satisfying the black defect condition and the pixel does not correspond to the black defect condition.

Figure 6:
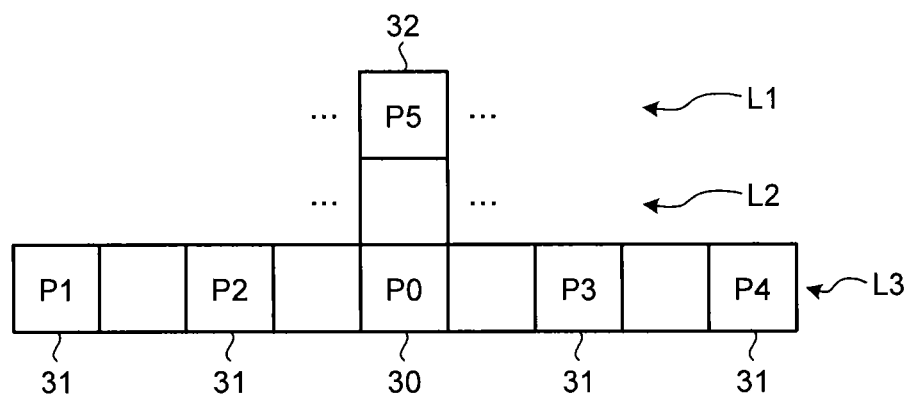
FIG. 6 is a diagram illustrating a pixel for which the signal substituting unit refers to a flag.

FIG. 6 is a diagram illustrating a pixel for which the signal substituting unit refers to a flag. For example, a pixel P0 which is the target pixel 30 and pixels P1, P2, P3, and P4 which are the horizontal peripheral pixels 31 are located in a line L3. The flag line memories 23 and 24 retain flags indicating whether the pixels correspond to the defect condition for the pixels of two lines L1 and L2 input to the defect correcting circuit 12 ahead of the line L3.

The pixel P5 located in the line L1 is parallel to the pixel P0 in the vertical direction via one pixel included in the line L2. The pixel P5 is a pixel with the same color as that of the pixel P0 which is the target pixel 30. The pixel P5 is a vertical peripheral pixel 32 which is parallel to the pixel P0 in the vertical direction in the pixel array 10. The signal substituting unit 22 reads the flag for the pixel P5 from the flag line memories 23 and 24, when it is judged whether the defect correction is performed on the pixel P0.

The line L1 is a line which is ahead of the line L3 via one line L2 and includes the pixels with the same color as that of the target pixel 30 of the line L3. The defect correcting circuit 12 can refer to the flag for the pixels of the line L1 in the defect correction on the pixels of the line L3 by applying the flag line memories 23 and 24 retaining the flags to the two lines.

When the condition judging unit 21 judges that the pixel does not correspond to the defect condition, the signal substituting unit 22 does not perform the signal substitution on the target pixel 30 and passes the signal of the target pixel 30 without change. When the condition judging unit 21 judges that the pixel corresponds to the defect condition, the signal substituting unit 22 judges whether the signal D1 or D5 satisfying the defect condition is the signal of the target pixel 30.

When the signal D1 or D5 satisfying the defect condition is not the signal of the target pixel 30, the signal substituting unit 22 does not perform the signal substitution on the target pixel 30 and passes the signal of the target pixel 30 without change. When the signal D1 or D5 satisfying the defect condition is the signal of the target pixel 30, the signal substituting unit 22 performs the signal substitution on the target pixel 30 according to the flag read from the flag line memories 23 and 24.

When the target pixel 30 corresponds to the defect condition and the flag indicating that the vertical peripheral pixel 32 does not correspond to the defect condition is read by any one of the flag line memories 23 and 24, the signal substituting unit 22 performs the signal substitution on the target pixel 30.

When the target pixel 30 corresponds to the defect condition and the flag indicating that the vertical peripheral pixel 32 corresponds to the defect condition is read by any one of the flag line memories 23 and 24, the signal substituting unit 22 stops the signal substitution on the target pixel 30. In this case, the signal substituting unit 22 passes the signal input for the target pixel 30 without change.

Figure 7:
FIG. 7 is a diagram illustrating a method of correcting a defect according to a comparative example of the embodiment.

FIG. 7 is a diagram illustrating a method of correcting a defect according to a comparative example of the embodiment. A defect correcting circuit according to the comparative example sets the central pixel among twenty five pixels forming a 5×5 pixel matrix as a target pixel. Peripheral pixels are pixels which have the same color as that of the target pixel in the matrix and are located near the target pixel. The matrix includes one target pixel and eight peripheral pixels. In the illustrated example, the target pixel and the peripheral pixels assumed to be Gr pixels.

The defect correcting circuit according to the comparative example permutates a signal of the target pixel and signals of the peripheral pixels to signals D1 to D9, for example, in order from a pixel with a higher signal level and performs the defect judgment. The defect correcting circuit judges whether the signal D1 is a signal of the white defect depending on a comparison result obtained by comparing a difference "D1−D2" between the signals D1 and D2 with a predetermined white defect judgment threshold value. When the signal D1 is the signal of the white defect and is the signal of the target pixel, the defect correcting circuit judges that the target pixel is a pixel with the white defect.

The defect correcting circuit judges whether the signal D9 is a signal of the black defect depending on a comparison result obtained by comparing a difference "D8−D9" between the signals D8 and D9 with a predetermined black defect judgment threshold value. When the signal D9 is a signal of the black defect and is the signal of the target pixel, the defect correcting circuit judges that the target pixel is a pixel with the black defect.

To perform such a process of the defect correcting circuit, a solid-state imaging device necessarily includes line memories storing at least four lines. By applying the line memories, the solid-state imaging device is able to perform the defect correction using the signals of the peripheral pixels included in lines located before and after a line including the target pixel, but the circuit size may increase.

In the solid-state imaging device, when the defect correcting circuit judges whether the target pixel is a pixel with a defect using only the peripheral pixels located in the line including the target pixel, an increase in the circuit size can be suppressed to the extent that the line memories are unnecessary. However, when the defect judgment is performed using only the signals of the pixels located in the same line, erroneous correction of a component present in an original subject easily occurs. For example, when components in a line extending in the vertical direction are judged to be components of a defect by the defect correcting circuit and signal substitution is performed, some or all of the components may be changed.

When the image sensor 5 according to this embodiment uses the flag line memories 23 and 24 storing information of one bit per pixel as a flag, the circuit size can be reduced, compared to, for example, a case in which line memories storing 10-bit image signals per pixel for a plurality of lines are mounted. Further, the defect correcting circuit 12 can suppress erroneous correction on the components present in a subject by referring to a judgment result of the vertical peripheral pixel 32 in the condition judging unit 21.

Figure 8:
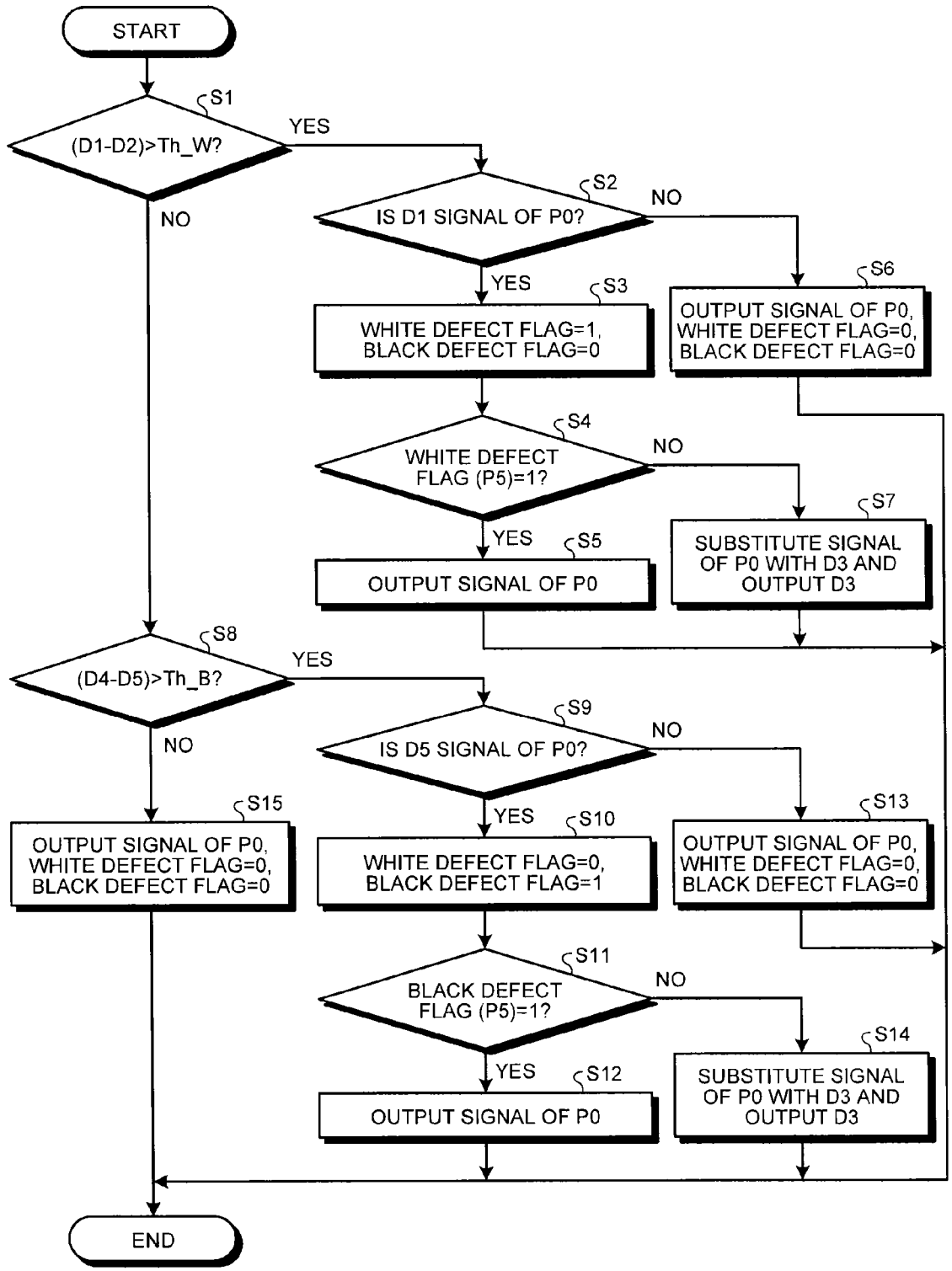
FIG. 8 is a flowchart illustrating a defect correction order by the defect correcting circuit according to the embodiment.

FIG. 8 is a flowchart illustrating a defect correction order by the defect correcting circuit according to this embodiment. Here, a case in which the pixel P0 illustrated in FIG. 6 is set to the target pixel 30 will be exemplified. The condition judging unit 21 permutates the signal of the pixel P0 and the signals of the pixels P1 to P4 which are horizontal peripheral pixels 31 to the signals D1 to D5 (see FIG. 5), for example, in order from the signal with a higher signal level.

The condition judging unit 21 calculates the difference (D1−D2) between the signal D1 with the highest signal level and the signal D2 with a signal level higher after the signal D1, and then judges whether "(D1−D2)>Th_W," which is the white defect condition, is satisfied (step S1). When "(D1−D2)>Th_W" is satisfied (Yes in step S1), the signal substituting unit 22 judges whether the signal D1 is the signal of the pixel P0 (step S2).

When the signal D1 is not the signal of the pixel P0 (No in step S2), the signal substituting unit 22 does not perform the signal substitution on the pixel P0 and outputs the input signal without change (step S6). Further, the signal substituting unit 22 writes a white defect flag indicating that the pixel P0 does not correspond to the white defect condition, for example, "0", to the flag line memory 23 (where the white defect flag=0). The signal substituting unit 22 writes a black defect flag indicating that the pixel P0 does not correspond to the black defect, for example, "0", to the flag line memory 24 (where the black defect flag=0). Thus, the defect correcting circuit 12 ends the process performed using the pixel P0 as the target pixel 30.

When the signal D1 is the signal of the pixel P0 (Yes in step S2), the signal substituting unit 22 writes a white defect flag indicating that the pixel P0 corresponds to the white defect condition, for example, "1", to the flag line memory 23 (where the white defect flag=1). The signal substituting unit 22 writes the black defect flag "0" for the pixel P0 to the flag line memory 24 (where the black defect flag=0) (step S3). When the pixel P0 corresponds to the white defect condition, the signal substituting unit 22 sets the white defect flag to "1," irrespective of the execution and the stop of the signal substitution to be described below.

After step S3, the signal substituting unit 22 reads the white defect flag, which is stored in the flag line memory 23, for the pixel P5 which is the vertical peripheral pixel 32. When the white defect flag read for the pixel P5 is "1" (Yes in step S4), the signal substituting unit 22 stops the signal substitution on the pixel P0 and outputs the input signal without change (step S5). Thus, the defect correcting circuit 12 ends the process performed using the pixel P0 as the target pixel 30.

In this way, when it is recognized that the target pixel 30 and the vertical peripheral pixel 32 parallel to each other in the vertical direction both correspond to the white defect condition, the defect correcting circuit 12 does not perform the defect correction by considering that the signals from the pixels corresponding to the white defect condition are not signals produced due to the white defect but signals produced from the components present in a subject. In this case, the defect correcting circuit 12 can effectively suppress erroneous correction on components from which the signals with a high level continue in the vertical direction in the subject.

When the white defect flag read for the pixel P5 is "0" (No in step S4), the signal substituting unit 22 performs the signal substitution on the pixel P0. For example, the signal substituting unit 22 substitutes the signal of the pixel P0 with the signal D3 which is the median value among the signals D1 to D5 and outputs the signal D3 (step S7). Thus, the defect correcting circuit 12 ends the process performed using the pixel P0 as the target pixel 30.

The defect correcting circuit 12 performs the defect correction on the target pixel 30, when the target pixel 30 corresponds to the white defect condition and the vertical peripheral pixel 32 does not correspond to the white defect condition. The defect correcting circuit 12 may substitute the signal of the pixel P0 with a signal other than the signal D3. The defect correcting circuit 12 may substitute the signal of the pixel P0 with an average of the signals D2 and D3, an average of the signals D3 and D4, or the like.

When "(D1−D2)>Th_W" is not satisfied (No in step S1), the condition judging unit 21 calculates a difference (D4−D5) between the signal D5 with the lowest signal level and the signal D4 with a signal level lower after the signal D5, and then judges whether "(D4−D5)>Th_B" which is the black defect condition is satisfied (step S8).

When "(D4−D5)>Th_B" is satisfied (Yes in step S8), the signal substituting unit 22 judges whether the signal D5 is the signal of the pixel P0 (step S9). When the signal D5 is not the signal of the pixel P0 (No in step S9), the signal substituting unit 22 does not perform the signal substitute on the pixel P0 and outputs the input signal without change (step S13).

Further, the signal substituting unit 22 writes the white defect flag "0" for the pixel P0 to the flag line memory 23 (where the white defect flag=0). The signal substituting unit 22 writes the black defect flag "0" for the pixel P0 to the flag line memory 24 (where the black defect flag=0). Thus, the defect correcting circuit 12 ends the process performed using the pixel P0 as the target pixel 30.

When the signal D5 is the signal of the pixel P0 (Yes in step S9), the signal substituting unit 22 writes the black defect flag "1" for the pixel P0 to the flag line memory 24 (where the black defect flag=1). The signal substituting unit 22 writes the white defect flag "0" for the pixel P0 to the flag line memory 23 (where the white defect flag=0) (step S10). When the pixel P0 corresponds to the black defect condition, the signal substituting unit 22 sets the black defect flag to "1," irrespective of the execution and the stop of the signal substitution to be described below.

After step S10, the signal substituting unit 22 reads the black defect flag, which is stored in the flag line memory 24, for the pixel P5 which is the vertical peripheral pixel 32. When the black defect flag read for the pixel P5 is "1" (Yes in step S11), the signal substituting unit 22 stops the signal substitution on the pixel P0 and outputs the input signal without change (step S12). Thus, the defect correcting circuit 12 ends the process performed using the pixel P0 as the target pixel 30.

In this way, when it is recognized that the target pixel 30 and the vertical peripheral pixel 32 parallel to each other in the vertical direction both correspond to the black defect condition, the defect correcting circuit 12 does not perform the defect correction by considering that the signals from the pixels corresponding to the defect condition are not signals produced due to the black defect but signals produced from the components present in a subject. In this case, the defect correcting circuit 12 can effectively suppress erroneous correction on components from which the signals with a low level continue in the vertical direction in the subject.

When the black defect flag read for the pixel P5 is "0" (No in step S11), the signal substituting unit 22 performs the signal substitution on the pixel P0. For example, the signal substituting unit 22 substitutes the signal of the pixel P0 with the signal D3 which is the median value among the signals D1 to D5 and outputs the signal D3 (step S14). Thus, the defect correcting circuit 12 ends the process performed using the pixel P0 as the target pixel 30.

The defect correcting circuit 12 performs the defect correction on the target pixel 30, when the target pixel 30 corresponds to the black defect condition and the vertical peripheral pixel 32 does not correspond to the black defect condition. The defect correcting circuit 12 may substitute the signal of the pixel P0 with a signal other than the signal D3. The defect correcting circuit 12 may substitute the signal of the pixel P0 with an average of the signals D2 and D3, an average of the signals D3 and D4, or the like.

When "(D4−D5)>Th_B" is not satisfied (No in step S8), the signal substituting unit 22 does not perform the signal substitution on the pixel P0 and outputs the input signal without change (step S15). The signal substituting unit 22 writes the white defect flag "0" for the pixel P0 to the flag line memory 23 (where the white defect flag=0). The signal substituting unit 22 writes the black defect flag "0" for the pixel P0 to the flag line memory 24 (where the black defect flag=0). Thus, the defect correcting circuit 12 ends the process performed using the pixel P0 as the target pixel 30.

When the defect correcting circuit 12 ends the process performed using the pixel P0 as the target pixel 30, the defect correcting circuit 12 starts a process performed using the subsequent pixel continuous from the pixel P0 as the target pixel 30. Further, any order of the judgment on the white defect in step S1 and the judgment on the black defect in step S8 in the condition judging unit 21 can be used, and may be appropriately modified.

Thus, by applying the defect correcting circuit 12 to the image sensor 5 according to this embodiment, the circuit size can be reduced. Therefore, it is possible to obtain the advantage of obtaining a high-quality image through the accurate defect correction.

Figure 9:
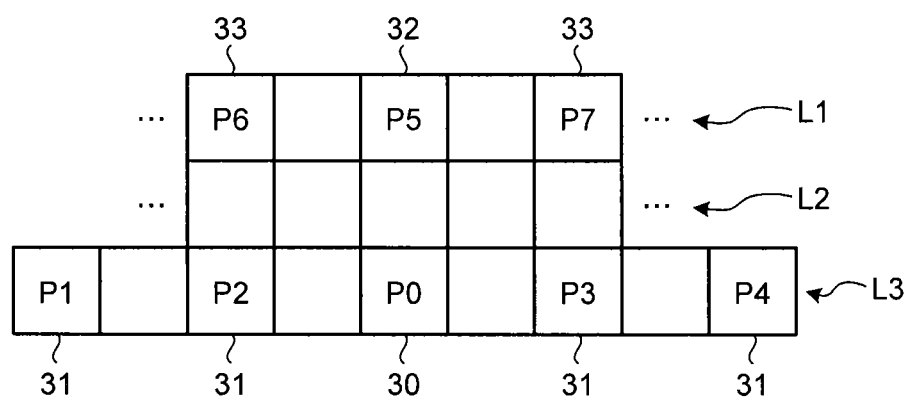
FIG. 9 is a diagram illustrating a process of a signal substituting unit according to a modification example.

FIG. 9 is a diagram illustrating a process of a signal substituting unit according to a modification example. In this modification example, when it is judged whether the defect correction is performed on the pixel P0, the signal substituting unit 22 refers to flags indicating whether the pixels correspond to the defect condition not only for the pixel P5 which is the vertical peripheral pixel 32 but also for the pixels P6 and P7 which are oblique peripheral pixels 33.

The oblique peripheral pixels 33 are pixels with the same color as that of the target pixel 30 and are pixels parallel to the target pixel 30 in oblique directions with respect to the horizontal and vertical directions. The pixels P6 and P7 which are the oblique peripheral pixels 33 are located in the line L1 which is the same as the line of the pixel P5 which is the vertical peripheral pixel 32. The pixels P5 to P7 are parallel to each other every other pixel in the horizontal direction, centering on the pixel P5. The pixels P6 and P7 located in the line L1 are both parallel to each other in the oblique directions of the pixel P0 via one pixel included in the line L2.

In step S4 illustrated in FIG. 8, the signal substituting unit 22 reads the white defect flags stored in the flag line memory 23 for the pixel P5 which is the vertical peripheral pixel 32 and the pixels P6 and P7 which are the oblique peripheral pixels 33. When at least one of the white defect flags read for the pixels P5 to P7 is "1," the signal substituting unit 22 stops the signal substitution on the pixel P0 and outputs the input signal without change (step S5).

The defect correcting circuit 12 does not perform the defect correction, when it is recognized that at least one of a set of the pixels parallel to each other in the vertical direction and a set of the pixels parallel to each other in the oblique directions continuously corresponds to the white defect condition. In this case, the defect correcting circuit 12 can effectively suppress erroneous correction on components for which signals with a high level continue in the vertical direction and components for which signals with a high level continue in the oblique directions in a subject.

When all of the white defect flags read for the pixels P5 to P7 are "0," the signal substituting unit 22 performs the signal substitution on the pixel P0 (step S7). The defect correcting circuit 12 performs the defect correction on the target pixel 30, when the target pixel 30 corresponds to the white defect condition and all of the vertical peripheral pixel 32 and the oblique peripheral pixels 33 do not correspond to the white defect condition.

In step S11, the signal substituting unit 22 reads the black defect flags stored in the flag line memory 24 for the pixels P5 to P7. When at least one of the black defect flags read for the pixels P5 to P7 is "1," the signal substituting unit 22 stops the signal substitution on the pixel P0 and outputs the input signal without change (step S12).

The defect correcting circuit 12 does not perform the defect correction, when it is recognized that at least one of a set of the pixels parallel to each other in the vertical direction and a set of the pixels parallel to each other in the oblique directions continuously corresponds to the black defect condition. In this case, the defect correcting circuit 12 can effectively suppress erroneous correction on components for which signals with a low level continue in the vertical direction and components for which signals with a low level continue in the oblique directions in the subject.

When all of the black defect flags read for the pixels P5 to P7 are "0," the signal substituting unit 22 performs the signal substitution on the pixel P0 (step S14). The defect correcting circuit 12 performs the defect correction on the target pixel 30, when the target pixel 30 corresponds to the black defect condition and all of the vertical peripheral pixel 32 and the oblique peripheral pixels 33 do not correspond to the black defect condition.

According to the modification example, the defect correcting circuit 12 can effectively suppress the erroneous correction on the components in a line extending in the vertical direction and the components in lines extending in the oblique directions in the subject. The image sensor 5 can obtain a high-quality image through the accurate defect correction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
circuitry that performs defect correction on an image signal from a pixel array, the circuitry being configured to
judge whether a target pixel corresponds to a defect condition based on a signal of the target pixel and a signal of a horizontal peripheral pixel in the image signal, the target pixel and the horizontal peripheral pixel being arranged in a horizontal direction in the pixel array, the target pixel and the horizontal peripheral pixel being pixels for detecting light of same color, and
perform signal substitution on the target pixel corresponding to the defect condition,
wherein the circuitry stops the signal substitution on the target pixel in a case, before judgment on the target pixel, where the circuitry judges that at least one of a vertical peripheral pixel and an oblique peripheral pixel corresponds to the defect condition, the vertical peripheral pixel and the oblique peripheral pixel being included in a line whose an image signal is input to the circuitry ahead of an image signal of a line including the target pixel, the vertical peripheral pixel and the target pixel being arranged in a vertical direction in the pixel array, the oblique peripheral pixel and the target pixel being arranged in an oblique direction in the pixel array,
the target pixel, the vertical peripheral pixel, and the oblique peripheral pixel being pixels for detecting light of the same color.

2. The image processing device according to claim 1, wherein, when the circuitry judges that the target pixel corresponds to the defect condition, the circuitry performs the signal substitution on the target pixel in a case, before judgment on the target pixel, where the circuitry judges that the vertical peripheral pixel does not correspond to the defect condition.

3. The image processing device according to claim 1, wherein, when the circuitry judges that the target pixel corresponds to the defect condition, the circuitry performs the signal substitution on the target pixel in a case, before judgment on the target pixel, the circuitry judges that both of the vertical peripheral pixel and the oblique peripheral pixel do not correspond to the defect condition.

4. The image processing device according to claim 1,
wherein the circuitry includes a memory that retains a judgment result of the circuitry as a flag,
the memory retains a flag of each pixel of a line whose an image signal is input to the circuitry ahead of an image signal of a line including a target pixel, and
the circuitry performs the signal substitution on the target pixel in accordance with a judgment result on the target pixel and a flag read from the memory.

5. The image processing device according to claim 4, wherein the memory retains a flag of each pixel of two lines whose image signals are input to the circuitry ahead of an image signal of a line including the target pixel and the horizontal peripheral pixel.

6. An image processing device comprising:
   circuitry that performs defect correction on an image signal from a pixel array, the circuitry being configured to
   judge whether a target pixel corresponds to a defect condition based on a signal of the target pixel and a signal of a horizontal peripheral pixel in the image signal, the target pixel and the horizontal peripheral pixel being arranged in a horizontal direction in the pixel array, the target pixel and the horizontal peripheral pixel being pixels for detecting light of same color, and
   perform signal substitution on the target pixel corresponding to the defect condition,
   wherein the circuitry includes a memory that retains a judgment result of the circuitry as a flag,
   the memory retains a flag of each pixel of a line whose an image signal is input to the circuitry ahead of an image signal of a line including the target pixel, and
   the circuitry performs signal substitution on the target pixel in accordance with a judgment result on the target pixel and a flag read from the memory.

7. The image processing device according to claim 6, wherein, when a flag, which indicates that a vertical peripheral pixel corresponds to the defect condition, is read from the memory, the circuitry stops the signal substitution on the target pixel, the vertical peripheral pixel and the target pixel being arranged in a vertical direction in the pixel array, the target pixel and the vertical peripheral pixel being pixels for detecting light of the same color.

8. The image processing device according to claim 6, wherein, when a flag, which indicates that at least one of a vertical peripheral pixel and an oblique peripheral pixel corresponds to the defect condition, is read from the memory, the circuitry stops the signal substitution on the target pixel, the vertical peripheral pixel and the target pixel being arranged in a vertical direction in the pixel array, the oblique peripheral pixel and the target pixel being arranged in an oblique direction in the pixel array,
   the target pixel, the vertical peripheral pixel, and the oblique peripheral pixel being pixels for detecting light of the same color.

9. The image processing device according to claim 6, wherein, when the circuitry judges that the target pixel corresponds to the defect condition and a flag, which indicates that a vertical peripheral pixel does not correspond to the defect condition, is read from the memory, the circuitry performs signal substitution on the target pixel, the vertical peripheral pixel and the target pixel being arranged in a vertical direction in the pixel array, the target pixel and the vertical peripheral pixel being pixels for detecting light of the same color.

10. The image processing device according to claim 6, wherein, when the circuitry judges that the target pixel corresponds to the defect condition and flags, which indicate that both of a vertical peripheral pixel and an oblique peripheral pixel do not correspond to the defect condition, are read from the memory, the circuitry performs signal substitution on the target pixel, the vertical peripheral pixel and the target pixel being arranged in a vertical direction in the pixel array, the oblique peripheral pixel and the target pixel being arranged in an oblique direction in the pixel array,
   the target pixel, the vertical peripheral pixel, and the oblique peripheral pixel being pixels for detecting light of the same color.

11. The image processing device according to claim 6, wherein the memory retains a flag of each pixel of two lines whose image signals are input to the circuitry ahead of a signal of a line including the target pixel and the horizontal peripheral pixel.

12. An image processing method comprising:
    performing defect correction on an image signal from a pixel array in circuitry,
    wherein the defect correction includes
    judging whether a target pixel corresponds to a defect condition based on a signal of the target pixel and a signal of a horizontal peripheral pixel in the image signal, the target pixel and the horizontal peripheral pixel being arranged in a horizontal direction in the pixel array, the target pixel and the horizontal peripheral pixel being pixels for detecting light of same color;
    retaining a flag which indicates a judgment result of whether each pixel of a line corresponds to the defect condition, an image signal of the line being input to the circuitry ahead of an image signal of a line including the target pixel; and
    performing signal substitution on the target pixel in accordance with the judgment result of whether the target pixel corresponds to the defect condition and a flag that is read.

13. The image processing method according to claim 12, wherein, when a flag, which indicates that a vertical peripheral pixel corresponds to the defect condition, is read, the signal substitution on the target pixel stops, the vertical peripheral pixel and the target pixel being arranged in a vertical direction in the pixel array, the target pixel and the vertical peripheral pixel being pixels for detecting light of the same color.

14. The image processing method according to claim 12, wherein, when a flag, which indicates that at least one of a vertical peripheral pixel and an oblique peripheral pixel corresponds to the defect condition, is read, the signal substitution on the target pixel stops, the vertical peripheral pixel and the target pixel being arranged in a vertical direction in the pixel array, the oblique peripheral pixel and the target pixel being arranged in an oblique direction in the pixel array,
    the target pixel, the vertical peripheral pixel, and the oblique peripheral pixel being pixels for detecting light of the same color.

15. The image processing method according to claim 12, wherein, when it is judged that the target pixel corresponds to the defect condition and a flag, which indicates that a vertical peripheral pixel does not correspond to the defect condition, is read, the signal substitution on the target pixel is performed, the vertical peripheral pixel and the target pixel being arranged in a vertical direction in the pixel array, the target pixel and the vertical peripheral pixel being pixels for detecting light of the same color.

16. The image processing method according to claim 12, wherein, when it is judged that the target pixel corresponds to the defect condition and flags, which indicate that both of a vertical peripheral pixel and an oblique peripheral pixel do not correspond to the defect condition, are read, the signal substitution on the target pixel is performed, the vertical peripheral pixel and the target pixel being arranged in a vertical direction in the pixel array, the oblique peripheral pixel and the target pixel being arranged in an oblique direction in the pixel array,
    the target pixel, the vertical peripheral pixel, and the oblique peripheral pixel being pixels for detecting light of the same color.

17. The image processing method according to claim 12, further comprising:

retaining a flag of each pixel of two lines whose image signals are input to the circuitry ahead of a signal of a line including the target pixel and the horizontal peripheral pixel.

18. The image processing method according to claim 12, wherein, in a case, before judgment on a target pixel, it is judged that a vertical peripheral pixel corresponds to the defect condition, the signal substitution on the target pixel stops, the vertical peripheral pixel and the target pixel being arranged in a vertical direction in the pixel array, the target pixel and the vertical peripheral pixel being pixels for detecting light of the same color.

19. The image processing method according to claim 12, wherein, in a case, before judgment on a target pixel, it is judged that at least one of a vertical peripheral pixel and an oblique peripheral pixel corresponds to the defect condition, the signal substitution on the target pixel stops, the vertical peripheral pixel and the target pixel being arranged in a vertical direction in the pixel array, the oblique peripheral pixel and the target pixel being arranged in an oblique direction in the pixel array, the target pixel, the vertical peripheral pixel, and the oblique peripheral pixel being pixels for detecting light of the same color.

* * * * *